United States Patent [19]

Acker

[11] Patent Number: 4,685,073

[45] Date of Patent: Aug. 4, 1987

[54] INTELLIGENT DISPLAY SYSTEM FOR INDICATING SUCCESSIVELY OCCURING NUMERICAL VALUES

[76] Inventor: Norbert Acker, Falltorweg 5, 6072 Dreieich, Fed. Rep. of Germany

[21] Appl. No.: 716,750

[22] Filed: Mar. 27, 1985

[30] Foreign Application Priority Data

Apr. 3, 1984 [DE] Fed. Rep. of Germany ....... 3412297

[51] Int. Cl.[4] .............................................. G06G 7/48
[52] U.S. Cl. ................................. 364/551; 324/73 R; 364/556
[58] Field of Search ............... 364/550, 551, 556, 557, 364/578, 579, 580, 518; 324/73 R, 73 PC; 340/715; 371/20, 24, 25

[56] References Cited

U.S. PATENT DOCUMENTS

| 4,471,348 | 9/1984 | London et al. ............... 364/551 X |
| 4,541,066 | 9/1985 | Lewandowski ............... 364/551 X |
| 4,574,359 | 3/1986 | Ishizaka et al. ................. 364/557 |
| 4,575,806 | 3/1986 | Aldrich et al. .................. 364/557 |
| 4,592,000 | 5/1986 | Ishizaka et al. ................. 364/557 |

FOREIGN PATENT DOCUMENTS

2333070  2/1974  Fed. Rep. of Germany .

OTHER PUBLICATIONS

Sifam Ltd—Brochure—Harmony Microelectronic LCD Meter.

Primary Examiner—Errol A. Krass
Assistant Examiner—H. R. Herndon
Attorney, Agent, or Firm—Bucknam and Archer

[57] ABSTRACT

A display system is disclosed which is constructed and operates so that over an essentially unlimited range of variations of successive numerical values to be displayed the display of the values is performed with the highest possible resolution and also with the possibility of an exact reading of instantaneous values. This is principally achieved by splitting the respective present or current numerical value of the sequence of numerical values to be displayed into a more or less steady, digitally displayed base value and into an analog displayed difference value which reflects the dynamics. The determination of the base value is performed predictively by taking into account the dynamics of the successive numerical values having already occurred. The digital and analog display system disclosed is especially adapted to early recognize and observe drifts, trends and fluctuations in the succession of numerical values together with an exact reading of dynamic instantaneous values.

14 Claims, 6 Drawing Figures

INTELLIGENT DISPLAY SYSTEM FOR INDICATING SUCCESSIVELY OCCURING NUMERICAL VALUES

BACKGROUND OF THE INVENTION

The field of the invention is analog and/or digital display systems, and particularly, intelligent display systems for indicating successively occurring numerical values of a variable quantity.

There is a need to optically display the current or present value of a series of successively occurring numerical values of a variable quantity, such as a sequence of digitalized measured data values of a sensed or scanned variable quantity, for example, voltage, current, speed, temperature, and so on. The digitalization is performed, for example, by an analog-to-digital converter or by a counter converting measured input signals into digital output signals consisting of a sequence of numbers or numerical values having a more or less high degree of variations from one to the other value.

Generally, there are two basic types of display systems for optically indicating a series of successively occurring numerical values, namely analog or quasianalog displays (hereinafter simply referred to as analog displays) and digital displays. While conventional analog display systems show the dynamics and trend of a sequence of measured values, the optical indication is of limited accuracy and/or optical resolution. While digital display systems provide a highly accurate optical indication with a high resolution, they present a rather irregular display upon the slightest variation of the digits so that it is neither possible to read the indicated values nor to identify the trend and dynamics of the variations.

There are in common use combined display systems having analog and digital displays. However, each one of the analog and digital displays is arranged so as to optically indicate the total measured value. Hence, the above mentioned drawbacks of each one of the two types of indicating and display systems are not overcome by combining them into a single module. Regarding prior art analog and digital display systems reference is made to a digital meter having an analog trend bar, for example, to a "HARMONY" meter manufactured by SIFAM LTD, Torquay, Devon, England.

Further, there are known digital display devices wherein the lowest digit position or two or more of the last digit positions are associated with an analog display or are substituted thereby in order to obtain a higher optical resolution by means of the additional analog display. Indicating systems of this type have the disadvantage that value variations which extend from the analog display into the digital display or vice versa are difficult to read and to interpret. Hence, the respective present instantaneous values are hardly readable.

In a display system as disclosed in laid-open German patent application No. 2 333 070, provisions are made to optically indicate the deviation of a measured value from a given desired value. The deviation is an error value which represents the difference value between the varying measured actual value and the given desired value. The error value is displayed in an analog manner by means of a transparent scale carrier, on the rear side of which several light-emitting zones are provided side by side. In response to the direction and magnitude of the error value a more or less large number of adjacent light-emitting zones are activated with reference to a mark provided on the scale carrier, which mark represents the given desired value. This known optical display system can indicate deviations or error values only which occur with reference to a fixed desired value. Besides, only more or less small error values or deviations from said fixed desired value can be displayed with sufficiently high accuracy and resolution since otherwise the range of the analog display is exceeded. On the other hand, when the indication of larger error values is allowed with respect to a scale carrier of given dimensions, the optical resolution of the analog display is reduced. Hence, the field of application of this known optical display system is rather limited.

SUMMARY OF THE INVENTION

The present invention relates to a method and device for displaying a series of successively occurring numerical values of a variable quantity, such as digitized measured values, wherein from the series of successively occurring numerical values the respective presently occurring numerical value applied for display is split into a predictively determined, more or less static or steady reference or base value and into a difference value which reflects more or less the dynamics in the succession of numerical values and is displayed as analog (or quasianalog) value. More specifically, the improvement of the present invention is essentially seen therein that from a series of numerical values which successively occur for display the respective relevant dynamic portion is separated and applied to an analog display means. The remaining static portion represents a reference or base value which is predictively determined in such a manner that its rate of change is rather slow. Preferably, the more or less static base value is applied to a digital display means.

A general object of the invention is to optically display a succession of numerical values of a variable quantity with high accuracy and high resolution as well as with an indication of the trend and the dynamics in the sequence of values over an essentially unlimited range of value variations. This is accomplished by predictively determining and calculating the more or less static base value and indicating the difference value on an analog display. It is even possible to exactly read the respective present instantaneous values of the successive numerical values applied.

Another aspect of the invention is the predictive determination of the base value by means of using one or more defined and stored algorithms. For example, according to one of these algorithms a new base value is determined by subtracting from the present numerical value half the value of the analog display range. Then, the first analog display of a new difference value obtained by using the new base value takes place in the middle of the analog display range. Hence, in case of further variations in the successively occurring numerical values to be displayed positive and negative variations and trends can be indicated.

According to another aspect of the invention from a number of defined algorithms used to predictively determine a new base value a specific algorithm is selected in accordance with the existing trend detected in successive numerical values having occurred so as to place the display of the first difference value determined with the new base value in such a position along the analog indicating range that the relevant trend is optimally suited. This is accomplished, for example, that the first display of the new difference value is positioned at one or the other end of the analog display range when an upward or downward trend is detected, whereas the first indication of the new difference value takes place in the middle of the analog display range when an alternating trend is detected.

According to another aspect of the invention, the predictive determination of a new base value and the corresponding placement of the first new difference value along the analog indicating range can be made dependent on the existing trend and on the existing dynamics of the successive numerical values having occurred up to this point of time. The detection of the dynamics, i.e. the rate of change of the variations between successive numerical values having occurred, can be used to prevent the determination of a new base value and to digitally display the respective present numerical value. This mode of operation is performed, for example, when the dynamics are rather small. As soon as a predetermined dynamic threshold value is exceeded the mode of operation is changed over to the normal mode of operation comprising the predictive determination of new base values if necessary.

Another aspect of the invention is to provide for a better combining and reading of a digitally displayed base or reference value and of an analog displayed difference value. This is accomplished by rounding at least the lowest digit of the digitally displayed base value to "0".

Another aspect of the invention is the adjustment of the indicating range of the analog display means in response to the existing dynamics detected in the sequence of numerical values having occurred. The adjustment of the analog display range can be performed instead of a re-determination of the base value or in addition to the re-determination of the base value. The object achieved thereby is an optimization of the optical display.

Another general object of the invention is to achieve a smooth and sliding indication of the successive difference values obtained. This is achieved by supplementing the difference values obtained to a larger number by interpolation. Thereby, a smooth analog display of the difference values is guaranteed even in case of larger variations between the successive values to be displayed.

Another aspect of the invention is to supplement the information or data to be indicated in the display system. This is achieved by detecting the latest upper and latest lower trend reversal point and by continuously displaying the numerical values corresponding to these reversal points together with the present numerical value. Thus, it is possible to read exactly also quick and unregular variations in the sequence of successive numerical values.

The aspects of the invention disclosed herein in connection with the above mentioned interpolation operation and trend reversal indication are generally applicable to all types of analog display means with corresponding display features. Hence, these aspects of the invention are not limited to the particular analog display system described hereinafter. Furthermore, as already stated, in this specification and the appended claims the term "analog display" comprises also "quasi-analog display", i.e. digitized analog display, such as a segmented indication bar.

The display system according to the invention is implemented preferably by using a sequence-controlled computer means. A sequence-controlled computer means has the possibilities to process the successive numerical values for display without the need for rather expensive circuitry. Perferably, the display system disclosed is constructed in form of a microcomputer-controlled module by using computer and memory components inclusive of adequate timing and clock components well known in the art.

The display system according to the invention is especially suited for an early recognition and observation of drifts, trends and fluctuations in connection with an exact reading of dynamic instantaneous values in the sequence of their occurrance. Each new determination of the base value is predictively performed in the best possible way by taking into account the dynamic behavior of the numerical values already having occurred so as to display, as long as possible, all dynamic variations preferably by means of the difference values displayed as analog values. Perferably, the digitally displayed base value should be changed as little as possible.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
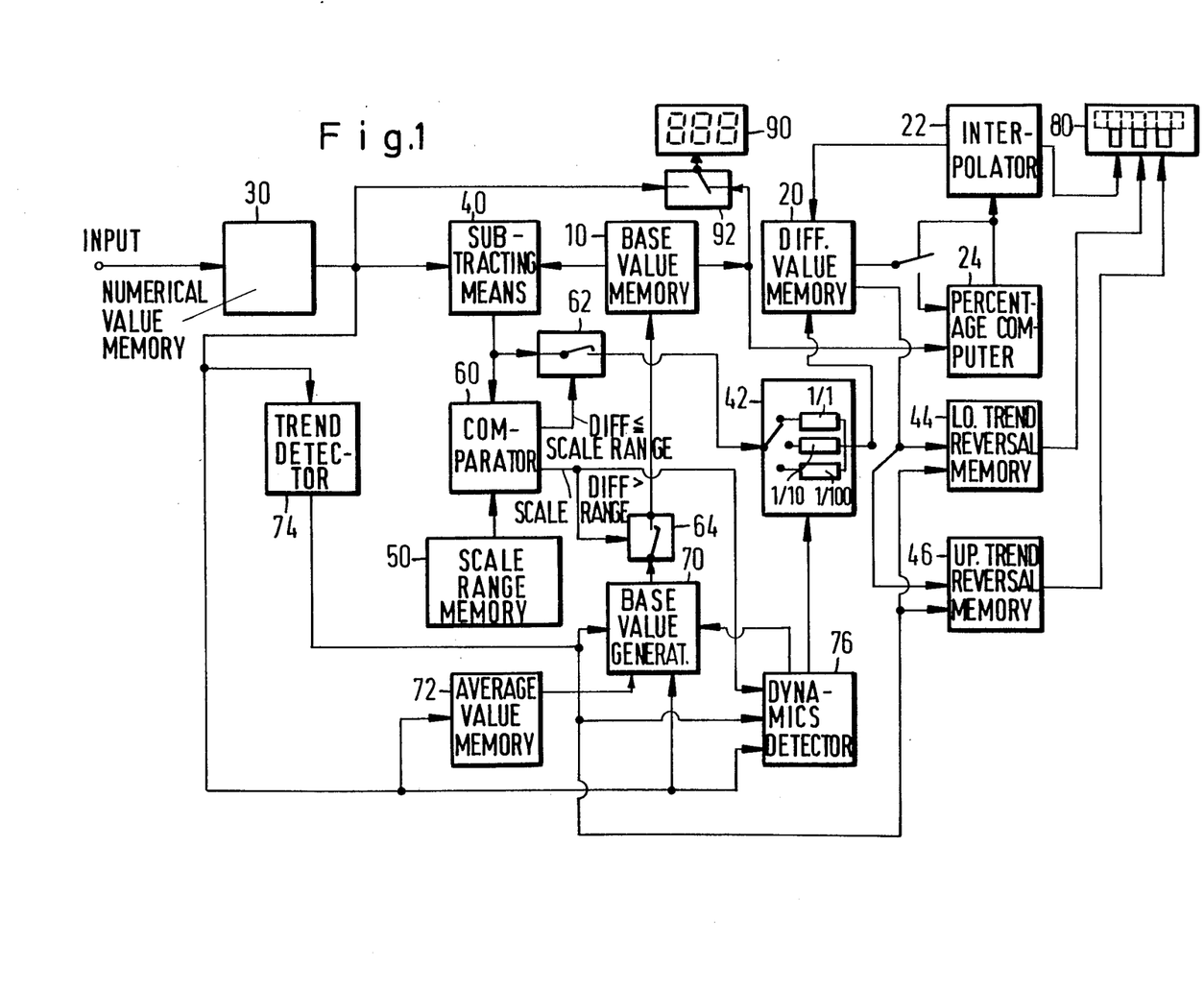
FIG. 1 is a schematic circuit diagram of a display device according to the principles of the present invention.

Referring particularly to FIG. 1, input signals corresponding to numerical values to be displayed by the display device are sequentially supplied to a numerical value memory 30. The successively generated numerical values are, for example, measured values digitalized in an analog-to-digital converter (not shown), well known in the art. For better understanding, the numerical values, spaced in time, are designated by the sequence of their occurrence at the input of memory 30 with $M_n$, $M_{n-1}$, $M_{n-2}$, ..., wherein $M_n$ is the current or present measured value, $M_{n-1}$ is the preceding measured value and so on. Depending on the respective field of application, the digitalized measured values or numerical values are sequentially supplied to the numerical value memory 30 with a rate of, for example, seven values per second.

The memory 30 is an intermediate type storage means arranged so as to temporarily store at a time, for example, the respective present and preceding numerical values $M_n$ and $M_{n-1}$. A subsequent numerical value $M_{n+1}$ will replace the existing present numerical value $M_n$ and will become the new present numerical value $M_n$, while the existing present numerical value then will become the new preceding numerical value $M_{n-1}$ replacing the existing preceding numerical value $M_{n-1}$, and so on.

The present numerical value $M_n$ is supplied to a subtracting means 40 and processed therein together with a reference or base value A stored in a reference or base value memory 10 so as to subtract one value from the other. The resulting difference of said two values is supplied to a comparator 60 and compared therein with the range value of the scale of an analog display means 80. By this comparison, it is found out whether the difference value calculated and obtained by the subtracting operation of the computer means 40 falls within the range of the scale of the analog display means 80. The range value of the scale is supplied to the comparator 60 from a scale range memory 50 wherein the respective range value of the scale is stored. Upon an automatic change of the scale range of the analog display means 40, the scale range memory 50 is updated also automatically. The scale range can, for instance, be composed of the presently set initial value and the presently set final value of the scale.

When the difference value calculated by the subtracting means 40 is smaller than or equal to the scale range of the analog display means 80, said difference value is supplied to a difference value memory 20 via a gate 62 enabled by a control signal (DIFF≦SCALE RANGE) of the comparator 60 and via a divider 42 described below in more detail. The difference value memory 20 wherein the presently existing or respective difference value B to be displayed is temporarily stored delivers a corresponding output signal to the analog display means 80 through an interpolator 22 and, selectively, through a percentage computer means 24.

When the difference value B calculated and delivered by the subtracting means 40 is larger than the present scale range of the analog display means 80, the comparator 60 produces a control signal (DIFF>SCALE RANGE) which initiates the determination of a new reference or base value A in a reference or base value generator 70. The generator 70 determines the new base value A at least by utilizing the present numerical value $M_n$ such that a new difference value B obtained by using the new base value A in the subtracting means 40 falls now within the presently set scale range of the analog display means 80. The new base value A determined by the base value generator 70 is received by the base value memory 10 through a gate 64 enabled by the control signal (DIFF>SCALE RANGE) of the comparator 60 and replaces there the base value so far used for forming the difference value. The difference value determined with the new base value A is supplied to the difference value memory 20 through the gate 62 now enabled by the comparator 60. The above explanations show that the comparator 60 enables either the gate 62 or the gate 64 in response to the result of the comparison operation performed by the comparator 60.

When the result of the comparison operation (DIFF>SCALE RANGE) calls for the determination of a new base value A, the new base value is determined not only by using the current or present numerical value $M_n$, but preferably by using additionally one or several numerical values $M_{n-1}$, $M_{n-2}$, ... preceding the present numerical value $M_n$. Accordingly, in the preferred embodiment of the invention, the output of the numerical value memory 30 is connected to the input of the base value generator 70 not only directly, but also indirectly through an average value generator 72, a trend detector 74, and a dynamics detector 76. The determination of base value A is therefore performed according to outputs of the average value generator 72, the trend detector 74 and the dynamics detector 76 which activate, individually or jointly, in response to corresponding logic operations an adequate algorithm from a number of algorithms prestored in the base value generator 70 to determine the new base value A.

The average value generator 72 determines continuously the average value from a respective given number of measured values or numerical values, such as $M_n$, $M_{n-1}$, $M_{n-2}$, ... Methods of forming average values are well known in the art so that further details are not required.

The trend detector 74 detects the trend T of the sequence of numerical values successively fed to the numerical value memory 30, i.e. the direction of the variation between successive numerical values. In the simplest case, the trend detector 74 compares the respective present and preceding numerical values $M_n$ and $M_{n-1}$ and produces an upward trend signal ($T_n = \nearrow$) or a downward trend signal ($T_n = \searrow$) for the respective present numerical value $M_n$ in response to the result of the comparison operation.

Figures 2, 3:
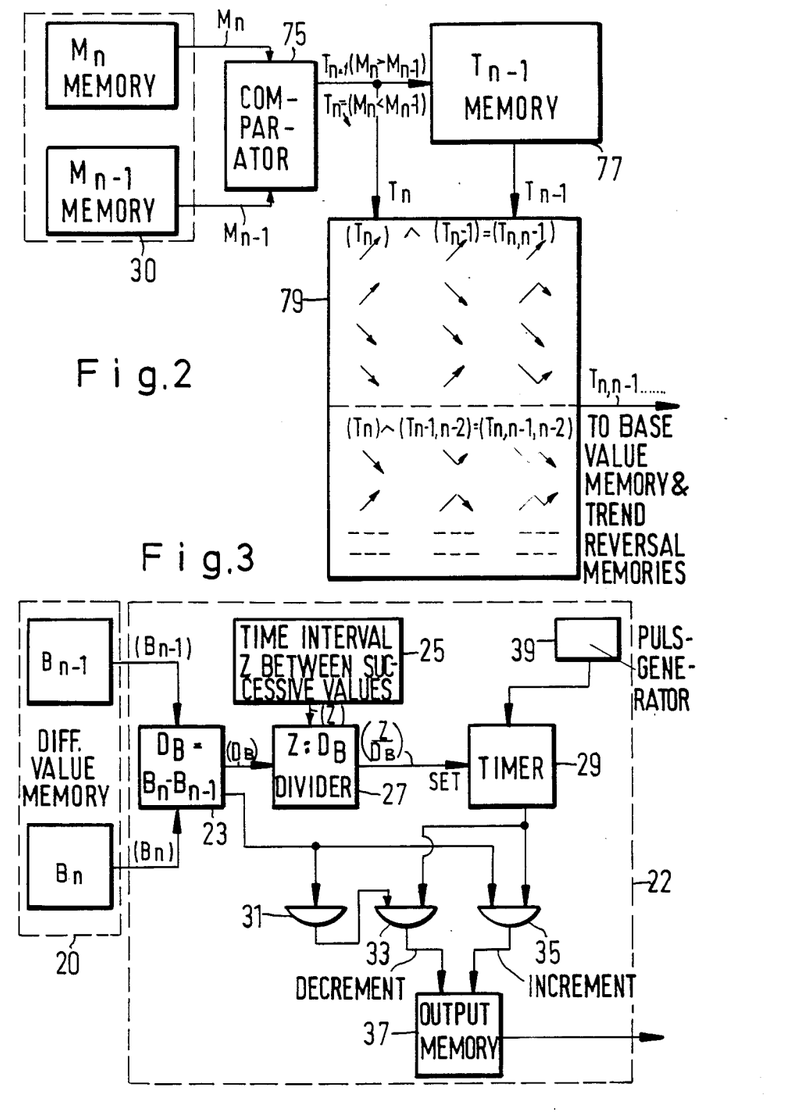
FIG. 2 is a schematic circuit diagram of a trend detector provided in the display device according to the invention.
FIG. 3 is a schematic circuit diagram of an interpolator provided in the display device according to the invention.

FIG. 2 shows a preferred embodiment of the trend detector 74. A comparator 75 compares the respective present numerical value $M_n$ and the respective preceding numerical value $M_{n-1}$. Said numerical values are stored preferably in the numerical value memory 30; however, as an alternative, they may also be stored in the trend detector 74. The comparator 75 generates for the respective present numerical value $M_n$, in response to the result of the comparison operation, an upward trend signal ($T_n = \nearrow$; $M_n > M_{n-1}$) or a downward trend signal ($T_n = \searrow$; $M_n < M_{n-1}$). This current trend signal $T_n$ is logically combined with a preceding trend signal $T_{n-1}$ obtained for the preceding numerical value $M_{n-1}$ and temporarily stored in a $T_{n-1}$ memory, so as to obtain a combined trend signal $T_{n,\,n-1}$ for the current numerical value $M_n$. The combined trend signal $T_{n,\,n-1}$ is generated and stored in a combinatorial logic and storing means 79. At the same time, the preceding trend signal $T_{n-1}$ is replaced in the $T_{n-1}$ memory 77 by the present trend signal $T_n$ for future use as new preceding trend signal $T_{n-1}$. In response to the fact whether the present trend signal $T_n$ and the preceding trend signal $T_{n-1}$ indicate, independently from each other, either an upward trend or a downward trend, the present combined trend signal $T_{n,\,n-1}$ has either an upward trend $\nearrow$, a downward trend $\searrow$ or one of two different alternating trends $\wedge$ or $\vee$. These trends $T_n$, $T_{n-1}$, and $T_{n,\,n-1}$ and the logic operations and functions connected therewith are referred to in lines 1 to 4 of the combinatorial logic and storing means 79 shown in FIG. 2. Of course, the trend $T_{n-2}$ preceding the preceding trend $T_{n-1}$ can also be used for forming a combined trend signal $T_{n,\,n-1,\,n-2}$. This is indicated in line 5 et seq. of the means 79. The detected, combined, and stored trend signals are available for the base value generator 70 to determine a new base value A.

The rate of change of the magnitudes of successive numerical values with respect to time is detected by the dynamics detector 76. A dynamic factor $D_n$ for the very present numerical value $M_n$ is defined to be in the simplest case, the rate of change per unit of time of the difference between the magnitudes of the present numerical value $M_n$ and the preceding numerical value $M_{n-1}$. Of course, like in the trend, not only the last two numerical values $M_n$ and $M_{n-1}$, can be considered but also further preceding numerical values $M_{n-2}, \ldots$. Depending on whether given dynamic threshold values are reached or exceeded, the dynamic detector 76 generates one or several levels of different dynamics to be used by the base value generator 70 for the determination of the base value A.

Preferably, the dynamics detector 76 is also used to increase or to decrease the scale range of the analog display means 80. For this purpose the divider 42 is provided. The divider 42 selectively utilizes differently large divider ratios to scale down the difference value B in response to which one of the given dynamic levels has been reached or exceeded. Greater dynamics result in smaller divider ratios and in a corresponding greater scale range setting. As mentioned before, the scale range memory 50 is automatically updated so that it reflects at any time the presently set range of the scale of the analog display means 80.

Figure 4:
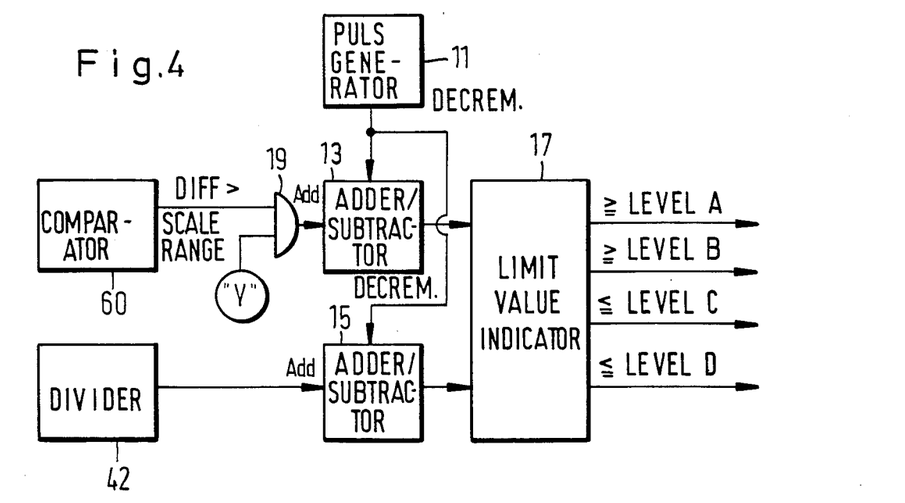
FIG. 4 is a schematic circuit diagram of a dynamic detector provided in the display device according to the invention.

FIG. 4 illustrates a preferred embodiment of the dynamics detector 76. A pulse generator 11 decrements continuously the memories of two adder/subtractor means 13 and 15 with a given frequency until they have reached the value zero. A fixed value "y" is added to the memory of the computing means 13 whenever the comparator 60 allows with its output control signal (DIFF>SCALE RANGE), which enables a gate 19, the transfer of the fixed value "y" to the computing means 13. On the other hand, the difference value obtained at the output of the divider 42 is added continuously to the memory of the computing means 15. When given values are reached or exceeded, the memory contents of the computing means 13 and 15 activate corresponding limit signals by means of a limit indicator 17. The outputs of the limit indicator 17 are used to determine the base value A and/or the scale range.

The interpolator 22 is used to supplement the successive measured values or numerical values supplied with a rate of, for example, seven values per second to up to about 100 indicated values per second so that also irregular variations of the measured values or numerical values are displayed by the analog display means 80 smoothly and slidingly in time-analogous manner. FIG. 3 shows a preferred embodiment of the interpolator 22. A subtracting means 23 forms a difference value $D_B$ between the present and the preceding difference values $B_n$ and $B_{n-1}$. The resulting difference value ($D_B = B_n - B_{n-1}$) is supplied to a dividing means 27. The respective difference values $B_n$ and $B_{n-1}$ are temporarily stored in the difference value memory 20 or, as an alternative, in the interpolator itself. In a memory 25, the time interval value Z for the respective input sequence of the measured values or numerical values is stored. The dividing means 27 divides the time value Z by the difference value $D_B$ and sets a timer 29 clocked by a pulse generator 39 with the result $Z/D_B$ obtained by the division operation. The timer 29 is, for example, a downward counter which is decremented by the pulse generator 39. Whenever the timer 29 is decremented to zero by the output of the pulse generator 39, the presently existing result $Z/D_B$ is always re-entered into the timer 29. The frequency of the pulse generator 39 is selected such that the output of the interpolator 22 becomes equal to the respective present difference value $B_n$ immediately before the successive difference value $B_{n+1}$ is ready to be processed by the interpolator 22 as new present difference value $B_n$.

The timer 29 increments or decrements in response to the sign of the difference $D_B$ an output memory 37 through correspondingly switched logic gates 31, 33 and 35. The output memory 37 actuates the analog display means 80 for sliding display of the respective difference value B. The interpolator 22 illustrated in FIG. 3 makes sure that the analog display smoothes out any irregular variations of the successive numerical values to be displayed and supplied to the numerical value memory 30.

The percentage computer 24 can be connected selectively between the difference value memory 20 and the interpolator 22 when the difference value B shall be displayed not as absolute deviation but as percentage deviation from the respective base value A. For this purpose the base value A produced at the output of the base value memory 10 is supplied to the percentage computer 24. The percentage computer is generally a dividing means which divides the resulting difference value B by the respective base value A.

The trend detector 74 already described is, preferably, in addition arranged so as to detect an upper and lower reversal of the trend of the input sequence of numerical values. In response to the detection of a trend reversal, the respectively last difference value B associated with an upper or lower trend reversal is stored in a lower trend reversal memory 44 or in an upper trend reversal memory 46, respectively. For this purpose the lower and the upper trend reversal memories 44 and 46 are connected to the output of the difference value memory 20 and to a control output of the trend detector 74. The respective two difference values B associated with the latest upper and lower trend reversals and stored in the memories 44 and 46 can be displayed together with the present difference value B on the analog display means 80.

Referring again to FIG. 1, the base value A stored in the base value memory 10 is also supplied to a digital display means 90 via a change-over switch 92. The controllable change-over switch 92 allows to digitally display selectively the respective base value A stored in the base value memory 10 or the present measured value or numerical value. The switch 92 can be operated manually or, preferably, automatically by an output of the dynamics detector 76. The change-over of the digital display from the base value A to the present numerical value $M_n$ for the lowest dynamic value may take place, for instance, when the dynamics detector detects a rather low dynamic variation of the successive numerical values, for example, when the limit value indicator 17 (FIG. 4) indicates that the lowest dynamic threshold value is the only one that is exceeded.

Figure 5:
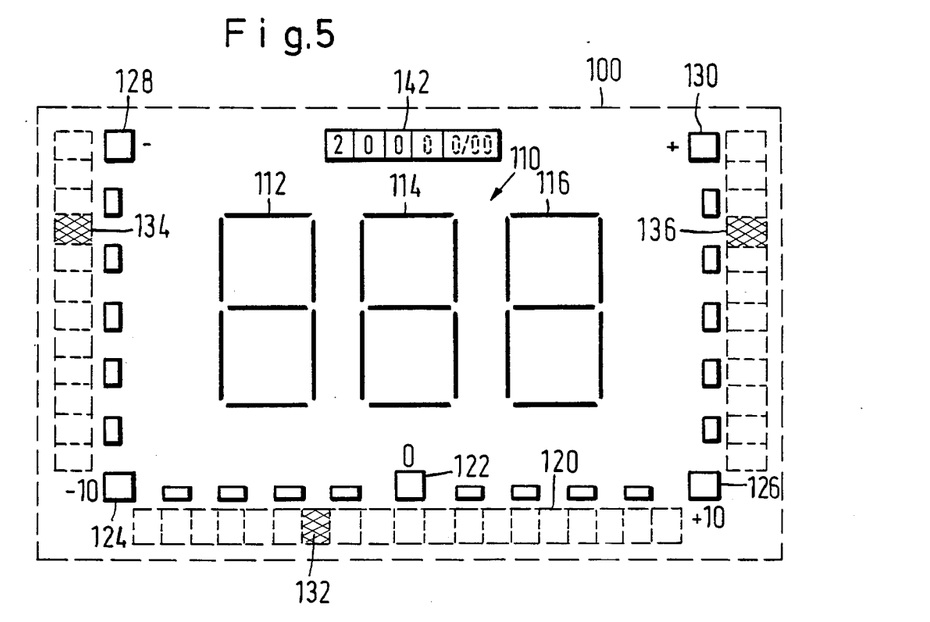
FIG. 5 is a preferred embodiment of the display field of the display device according to the invention.

FIG. 5 illustrates a preferred embodiment of the display field of the display device according to the invention. A multi-digit display 110 of the digital display means 90 is framed by a U-shaped analog display 120 of the analog display means 80. The displays may be performed e.g. by LCD and/or LED technologies. All the analog, quasi-analog, and digital technologies known in the art can be used to implement the combined indicating means 100. Also analog and digital displays produced on a screen by pattern generators can be used. This technique is also well known in the art.

Regarding the specific state of operation shown in FIG. 5, the zero point 122 on the scale of the analog display 120 is related to the reference or base value A digitally displayed by the digit positions 112, 114, 116, so that the difference value B is displayed on an analog plus/minus scale. The point 124 in the left lower corner of the scale corresponds with an analog display value of "−10" and the point 128 in the upper left corner of the scale corresponds with an analog display value of "−20". Likewise, the point 126 in the right lower corner of the scale corresponds with an analog display value of "+10" and the point 130 in the right upper corner of the scale corresponds with an analog display value of "+20".

The individual scale segments of the analog display 120 are formed in a manner known per se, by successive light-emitting zones which are activated by the output memory 37 of the interpolator 22 as well as the lower and upper trend reversal difference value memories 44 and 46. In the present example, an activated light-emitting zone 132 corresponds to the present difference value B, and activated light-emitting zones 134 and 136 correspond to the lower and upper trend reversal difference values. Preferably, a scale range indicator 142 adapted to be activated by the divider 42 is also provided on the display field.

Figure 6:
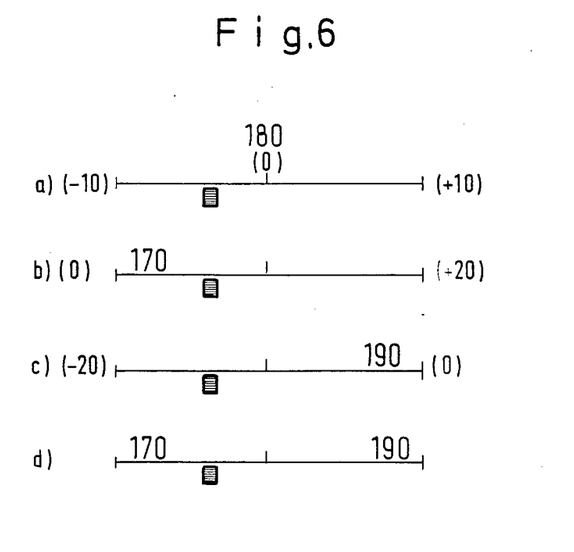
FIG. 6 are schematic illustrations of further embodiments of the display field of the display device according to the invention.

FIG. 6 is a diagrammic view of four further embodiments (a) to (d) of the display field of the display device according to the invention. In the illustrated state of operation, the present measured value or numerical value "175" shall be displayed in each of the four embodiments. Accordingly, with respect to embodiment (a), the digital display related to the middle of the analog scale shows the value "180", while the analog display indicates an analog value of "−5". Regarding embodiment (b), the digital display related to the left end point of the scale shows the value "170", while the analog display indicates an analog value of "+5". Regarding embodiment (c), the digital display related to the right end point of the scale shows the value "190", while the analog display indicates an analog value of "−15". Regarding embodiment (d), the left and the right end point of the scale are associated with digital displays showing the values "170" and "190", respectively, while the analog display indicates an analog value of "+5". The above explained embodiments (a) to (d) demonstrate that in a display device according to the invention the zero point of the scale of the analog display may be at any desired position along the analog scale.

The following table shows an example for calculating or determining the reference or base value A by means of the base value generator 70 when the analog display range has been exceeded by the difference value obtained from the subtracting means 40. In the example according to the table, it is assumed that the present numerical value is "186", that the average value obtained by the average value generator 70 is "176", and that the embodiment of FIG. 6(a) has been chosen for the analog scale.

TABLE

| Dynamics | Trend | Algorithm | Difference Value B | Base Value A |
|---|---|---|---|---|
| level 2 |  | numerical value "186" plus "20"; rounding off the last digit (units) | −20  0  +20  > | 200 |
| level 2 |  | numerical value "186" minus "11"; rounding off the last digit (units) | −20  0  +20  < | 170 |
| level 2 |  | numerical value "186"; rounding off the last digit (units) | −20  0  +20  < > | 180 |
| level 2 |  | numerical value "186" plus "9"; rounding off the last digit (units) | −20  0  +20  < > | 190 |
| level 2 |  | numerical value "186"; | −20  0  +20  < > | 186 |
| level 1 |  | average value "176" plus "5"; rounding off the last digit (units) | −20  0  +20  < > | 180 |

TABLE-continued

| Dynamics | Trend | Algorithm | Difference Value B | Base Value A |
|---|---|---|---|---|
| level 1 | ↗ | numerical value "186" plus "10"; rounding off the last digit (units) | −20  0  +20  ↑ > | 190 |
| level 1 | ↘ | numerical value "186" minus "1"; rounding off the last digit (units) | −20  0  +20  ↑ < | 180 |

Example of a table to calculate the base value A in case of the following values:
numerical value = 186;
average value = 176.

The first column of the table contains the dynamic levels detected by the dynamics detector 76. Level 2 stands for a higher dynamic behavior than level 1. The second column shows the trend detected by the trend detector 74. The third column shows the algorithm selected in response to the dynamic behavior and the trend to calculate the base value. The fourth column is a diagrammatic view of the analog scale with the present analog display value shown by pointer type display. The fifth column shows the base value A which is digitally displayed.

Further, the present invention is not limited to the above embodiments. Various variations and modifications may be made without departing from the scope of the present invention.

The schematic circuit diagram or block diagram of FIG. 1 shall be considered above all to explain the preferred functions according to the invention. The display device itself may be implemented in most different ways well known in the art. The various signal generating and computing means may be implemented by one single computer, and the various memories may be replaced by one single memory with corresponding storage capacity. The device according to the invention may me materialized by a correspondingly programmed microcomputer-controlled module. In the block diagram of FIG. 1 an interpolator provided directly behind the measured value memory 30 can be used rather than the interpolator 32. Likewise, instead of the divider 42, a divider can be used which is arranged directly before the analog display means 80. Moreover, instead of the pointer type display used for the difference value B in the described embodiments, the display can be performed by a bar which starts, for instance, from that position of the analog scale which is related to the base value A.

The display device according to the invention can be implemented by using, for example, a one-chip microcomputer, for example, Intel 8048/49, and an out driver Philips SAA 1060.

What is claimed is:

1. A method for displaying the dynamics of a series of successively occurring numerical values of a variable quantity on an analog display means, comprising the steps of:
   (a) forming the difference value between the present numerical value of said series of successive numerical values and a stored base value representing a reference value for said successively occurring numerical values;
   (b) comparing the difference value with an analog display range of said analog display means for determining whether the difference value formed falls within said analog display range or not;
   (c) if the difference value falls within said analog display range:
      (c1) displaying said difference value as analog value on said analog display range;
   (d) if the difference value does not fall within said analog display range on said analog display means:
      (d1) determining a new base value as a function of the present numerical value so that a new difference value formed between the present numerical value and the new base value falls within said analog display range,
      (d2) storing the new base value in replacement of the formerly stored base value,
      (d3) displaying said new difference value as analog value on said analog diplay range;
   (e) repeating the above steps upon occurrence of the next numerical value which then forms the new present value.

2. The method according to claim 1, wherein the new base value is determined also as a function of one or more numerical values preceding the present numerical value in said series of successive numerical values.

3. The method according to claim 1 wherein the new base value is determined as a function of one or more of the following parameters:
   (a) an average value formed by using several numerical values having occurred;
   (b) a trend detected in successive numerical values having occurred;
   (c) a trend reversal detected in successive numerical values having occurred, and
   (d) dynamics detected in successive numerical values having occurred.

4. The method according to claim 1 wherein said analog display range is predictively adjusted in response to dynamics detected in successive numerical values having occurred.

5. The method according to claim 1 wherein the new base value is determined so that the first new difference value formed between the present numerical value and the new calculated base value falls on or near a predetermined display position of said analog display range.

6. The method according to claim 1 wherein at least the lowest digit position of the new determined base value is rounded to "0".

7. The method according to claim 1 wherein the stored base value is indicated by digital display.

8. The method according to claim 1, wherein upon occurrence of a succeeding difference value for display intermediate difference values are generated by interpolation in a manner so that the difference value presently on display is increased or decreased by amounts of variation at time intervals obtained by dividing the time interval between successive numerical values by the difference formed between the difference value presently on display and the succeeding difference value to be displayed next, whereby said amounts of variation are so as to obtain a smooth transition between successively displayed analog values.

9. A device for displaying the dynamics of a series of successively occurring numerical values of a variable quantity on an analog display means, comprising:

(a) a numerical value memory for temporarily storing occuring numerical values of said series of successive numerical values;

(b) a base value memory for storing a base value representing a reference value for said successively occurring numerical values;

(c) means for forming the difference value between the present numerical value of said series of successive numerical values and the base value stored in the base value memory;

(d) analog display means;

(e) means for comparing the difference value with an analog display range of said analog display means so as to determine whether the difference value falls within said analog display range or not, and, if the difference value falls within said analog display range, for enabling the transfer of the difference value from the difference forming means to said analog display means so as to display the difference value as analog value on said analog display range, and, if the difference value does not fall within said analog display range, for initiating the determination of a new base value, (f) base value generating means responsive to the comparing means for determining a new base value as a function of at least one numerical value stored in the numerical value memory so that a new difference value formed between the present numerical value and the new base value falls within said analog display range;

(g) means for transferring the new base value from the base value generating means into the base value memory so as to store therein the new base value in replacement of the formerly stored base value, whereby the new difference value formed between the present numerical value and the new base value is now allowed by the comparing means to be transferred to said analog display means so as to display the new difference value as analog value on said analog display range.

10. The device according to claim 9, in which the base value generating means selects an algorithm among a number of given algorithms stored therein for determining the new base value.

11. The device according to claim 9 further comprising at least one of the following means for predictively determining the new base value:

(a) an average value generating means for obtaining an average value from several numerical values having occurred;

(b) a trend detector means for detecting the existing trend in successive numerical values having occurred;

(c) a trend reversal detector means for detecting a change from an up trend to a down trend or vice versa; and (d) a dynamics detector means for detecting the existing dynamics in successive numerical values having occurred.

12. The device according to claim 11, further comprising a divider responsive to said dynamics detector means for varying the analog display range of said analog display means.

13. The device according to claim 9 further comprising digital display means for displaying the base value stored in said base value memory as digital value.

14. The device according to claim 9 further comprising a difference value memory for storing difference values to be displayed as analog values, and an interpolator means associated with said difference value memory and said analog display memory, said interpolator means comprising subtracting means for forming the difference between a succeeding difference value to be displayed and the difference value presently displayed, a divider for dividing the time interval between successive numerical values by the difference formed by said subtracting means, a timer set in accordance with the result obtained from said divider, and an output memory incremented or decremented by the output pulses of said timer in response to the sign of the difference formed by said difference forming means, the output of said output memory being connected to said analog display means.

* * * * *